United States Patent
Pehlert et al.

(10) Patent No.: US 11,459,453 B2
(45) Date of Patent: Oct. 4, 2022

(54) BROAD MOLECULAR WEIGHT DISTRIBUTION POLYPROPYLENES WITH HIGH MELT FLOW RATES AND HIGH FLEXURAL MODULUS

(71) Applicant: ExxonMobil Chemical Patents Inc., Baytown, TX (US)

(72) Inventors: George J. Pehlert, Houston, TX (US); David K. Brown, Montgomery, TX (US)

(73) Assignee: ExxonMobil Chemical Patents Inc., Baytown, TX (US)

(*) Notice: Subject to any disclaimer, the term of this patent is extended or adjusted under 35 U.S.C. 154(b) by 355 days.

(21) Appl. No.: 16/616,273

(22) PCT Filed: May 9, 2018

(86) PCT No.: PCT/US2018/031804
§ 371 (c)(1),
(2) Date: Nov. 22, 2019

(87) PCT Pub. No.: WO2018/226345
PCT Pub. Date: Dec. 13, 2018

(65) Prior Publication Data
US 2020/0172716 A1    Jun. 4, 2020

Related U.S. Application Data

(60) Provisional application No. 62/516,145, filed on Jun. 7, 2017.

(51) Int. Cl.
*C08F 110/06* (2006.01)
*C08L 23/12* (2006.01)
(Continued)

(52) U.S. Cl.
CPC .......... *C08L 23/12* (2013.01); *B29C 45/0001* (2013.01); *B29K 2023/10* (2013.01);
(Continued)

(58) Field of Classification Search
None
See application file for complete search history.

(56) References Cited

U.S. PATENT DOCUMENTS 5,744,548 A    4/1998    Nohr et al.
6,087,750 A    7/2000    Raad
(Continued)

FOREIGN PATENT DOCUMENTS

EP    0919 572 A    6/1999
EP    1801155 A    6/2007
EP    2386 601 A    11/2011

OTHER PUBLICATIONS

Elmoumni, A. et al. in "Isotactic Poly(propylene) Crystallization: Role of Small Fractions of High or Low Molecular Weight Polymer," vol. 26 Macromol. Chem. Phys., vol. 26, pp. 125-134, 2005.
(Continued)

*Primary Examiner* — Richard A Huhn
(74) *Attorney, Agent, or Firm* — Vorys, Sater, Seymour and Pease LLP

(57) ABSTRACT

Provided is a reactor grade polypropylene suitable for injection molding applications comprising within a range from 0 wt % to 4 wt % ethylene and/or C4 to C12 α-olefin derived
(Continued)

units, the polypropylene produced from a single catalyst and single stage polymerization process, and having a melt flow rate (MFR, 230° C./2.16 kg) greater than 10 g/10 min, and a 1% secant flexural modulus of at least 250 kpsi (1720 MPa).

21 Claims, 2 Drawing Sheets

(51) Int. Cl.
  *B29C 45/00* (2006.01)
  *B29K 23/00* (2006.01)
(52) U.S. Cl.
  CPC ..... *B29K 2995/0037* (2013.01); *C08F 110/06* (2013.01); *C08L 2314/02* (2013.01)

(56) References Cited

U.S. PATENT DOCUMENTS

| | | | |
|---|---|---|---|
| 6,320,009 B1 * | 11/2001 | Nakano | C08L 23/142 526/351 |
| 6,350,828 B1 | 2/2002 | Takaoka et al. | |
| 6,747,103 B1 | 6/2004 | Vestberg et al. | |
| 6,809,168 B2 | 10/2004 | Agarwal et al. | |
| 7,319,122 B2 | 1/2008 | Cheng et al. | |
| 9,464,178 B2 | 10/2016 | Abubakar et al. | |

OTHER PUBLICATIONS

Minoshima, W. et al. in "Experimental Investigations of the Influence of Molecular Weight Distribution on the Rheological Properties of Polypropylene Melts," Poly. Eng. & Sci., vol. 20(17), pp. 1166, 1980.

Moya, L., E., et al. "Bimodal Poly( Propylene) through Binary Metallocene Catalytic Systems as an Alternative to Mel Blending", Macromol. Symp. vol. 321-322, pp. 46-52, 2012.

Seki, M. et al. in "Shear-Mediated Crystallization of Isotactic Polypropylene: The Role of Long Chain-Long Chain Overlap," Macromolecules, vol. 35, pp. 2583-2594, 2002.

Rabinowitsch, B., Über die Viskosität und Elastizität von Solen, Z. Physik. Chem,. vol. 1, pp. A145, 1929.

Sugimoto, M, et al. "Melt rheology of long-chain-branched polypropylenes", Rheologica ACTA, vol. 46, Issue 1, pp. 33-44, Oct. 2006.

Spitael, P, et al., "Strain Hardening in Polypropylenes and its Role in Extrusion Foaming", Poly. Sci. and Eng., vol. 44, pp. 2090-2100 2004.

Weng, W., et al. "Long Chain Branched Isotactic Polypropylene", Macromolecules, vol. 35, pp. 3838-3843, 2002.

* cited by examiner

BROAD MOLECULAR WEIGHT DISTRIBUTION POLYPROPYLENES WITH HIGH MELT FLOW RATES AND HIGH FLEXURAL MODULUS

PRIORITY CLAIM

This application is a National Phase Application claiming priority to PCT Application Serial No. PCT/US2018/031804 filed May 9, 2018, which claims priority to and the benefit of U.S. Provisional Application No. 62/516,145, filed Jun. 7, 2017, which are incorporated herein by reference.

FIELD OF THE INVENTION

The present invention relates to polypropylenes having a broad molecular weight distribution and high melt flow rate that maintain a high flexural modulus.

BACKGROUND

In the automotive industry, there is a need to find higher stiffness polypropylenes for down-gauging and light-weighting to achieve higher fuel mileage efficiency ratings. There have been developments in providing a broad molecular weight distribution polypropylene (BMW PP) for such purposes. These new polymers have a unique combination of high melt strength, good processability (shear thinning) and high stiffness in addition to the other attributes that standard polypropylene's have including high temperature resistance. What is needed is a polypropylene with similar attributes, but having higher melt flow rates for applications such as injection molding. The inventors have solved that problem in the current disclosure.

Relevant references include: U.S. Pat. Nos. 5,744,548; 6,087,750; 6,350,828; 6,747,103; 6,809,168; 7,319,122; 9,464,178; EP 1 801 155 A1; EP 2 386 601 A1; A. Elmoumni et al. in "Isotactic Poly(propylene) Crystallization: Role of Small Fractions of High or Low Molecular Weight Polymer," 26 MACROMOL. CHEM. PHYS. 125-134 (2005); M. Seki et al. in "Shear-Mediated Crystallization of Isotactic Polypropylene: The Role of Long Chain-Long Chain Overlap," 35 MACROMOLECULES 2583-2594 (2002); W. Minoshima et al. in "Experimental Investigations of the Influence of Molecular Weight Distribution on the Rheological Properties of Polypropylene Melts," 20(17) POLY. ENG. & SCI. 1166 (1980); B. Rabinowitsch, A145 Z. PHYSIK. CHEM. 1 (1929); 35 MACROMOLECULES 3838-3843 (2002); 46 RHEOL. ACTA 33-44 (2006); 44 POLY. SCI. AND ENG. 2090-2100 (2004); and MACROMOL. SYMP. 46-52, 321-322 (2012).

SUMMARY

Provided is a polypropylene comprising (or consisting of, or consisting essentially of) within a range from 0 wt % to 4 wt % ethylene and/or C4 to C12 α-olefin derived units, having a melt flow rate (MFR, 230° C./2.16 kg) greater than 10, or 20 g/10 min; an Mz/Mw of at least 4; and a flexural modulus of at least 250 (1720 MPa), or 280 (1930 MPa), or 300 kpsi (2070 MPa) (0.5 in/min ASTM D790(A)), wherein the polypropylene is reactor grade.

Also provided is a polypropylene comprising (or consisting of, or consisting essentially of) within a range from 0 wt % to 4 wt % ethylene and/or C4 to C12 α-olefin derived units, the polypropylene produced from a single catalyst and single stage polymerization process, and having a melt flow rate (MFR, 230° C./2.16 kg) within a range from 10, or 20 g/10 min to 80, or 100, or 200, or 300, or 400, or 500 g/10 min; and a flexural modulus of at least 250 (1720 MPa), or 280 (1930 MPa), or 300 kpsi (2070 MPa) (0.5 in/min ASTM D790(A)).

Also provided is a process to produce a polypropylene comprising within a range from 0 wt % to 4 wt % ethylene and/or C4 to C12 α-olefin derived units, the process comprising (or consisting of, or consisting essentially of) combining propylene and optional ethylene and/or C4 to C12 α-olefins with single catalyst in a single stage polymerization process, the resulting polypropylene having a melt flow rate (MFR, 230° C./2.16 kg) within a range from 10 to 500 g/10 min; and a flexural modulus of at least 250 kpsi (1720 MPa) (0.5 in/min ASTM D790(A)).

DETAILED DESCRIPTION

Figure 1:
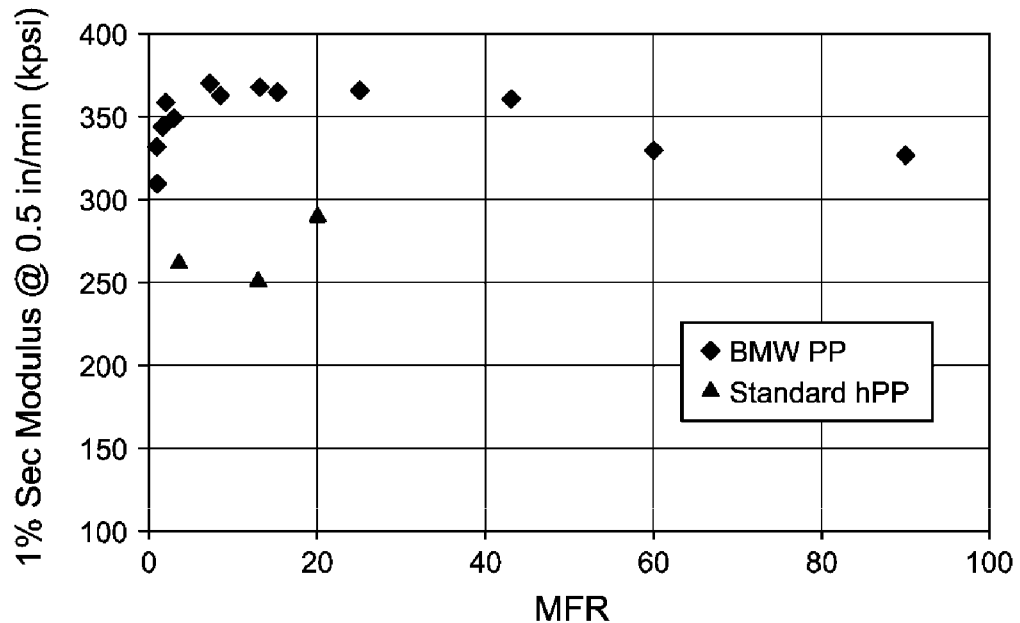
FIG. 1 is a plot of flexural modulus as a function of melt flow rate (MFR) for the first set of inventive (BMW) and commercial (standard) polypropylenes listed in Table 3.
Figure 2:
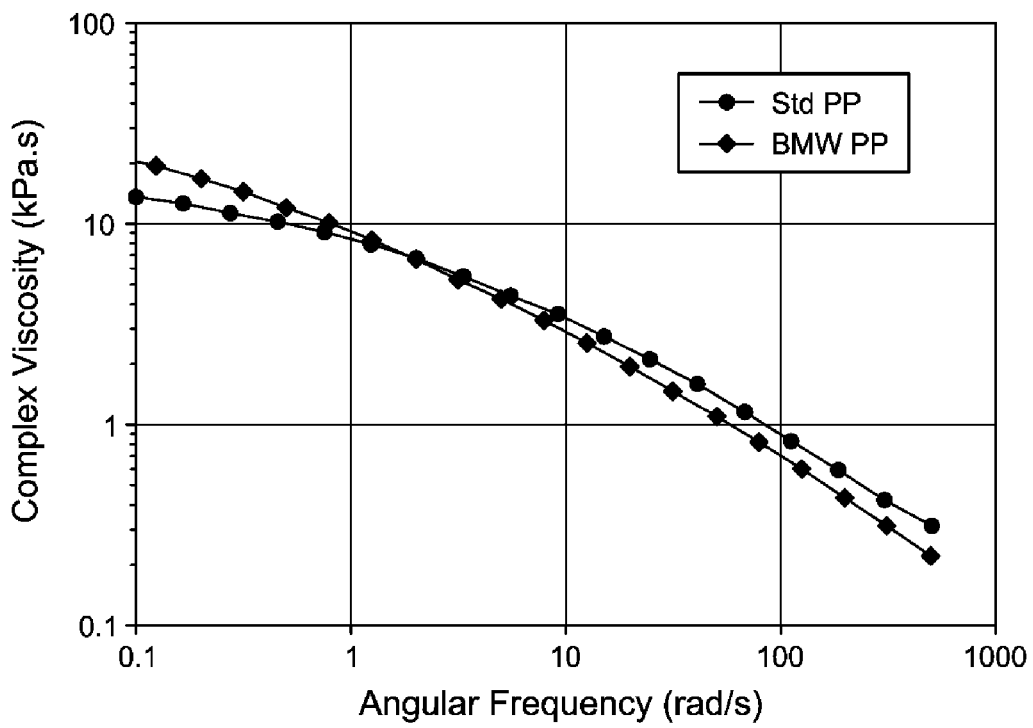
FIG. 2 is a Small Angle Oscillatory Spectroscopy (SAOS) plot of complex viscosity as a function of angular frequency for the inventive and commercial polypropylenes at MFR's of about 2 g/10 min.

The inventors have discovered that certain higher melt flow rate (MFR) polypropylenes, developed to access attributes for higher flow applications such as injection molding, also exhibit high stiffness and high flowability. This is surprising since the high stiffness is partially attributed to the concentration of ultra-high molecular weight polymer chains. It would be expected that higher melt flow rates, or overall lower molecular weight, would reduce the level of ultra-high molecular weight chains and lower the stiffness of the polymer. Nonetheless, the inventors have found that certain high MFR polypropylenes retain their stiffness.

Thus provided in any embodiment are reactor grade polypropylenes comprising (or consisting of, or consisting essentially of) within a range from 0 wt % to 2, or 4 wt % ethylene and/or C4 to C12 α-olefin derived units, having:
  a) a melt flow rate (MFR, 230° C./2.16 kg) of at least 10, or 20, or 25, or 30 g/10 min, or within a range from 10, or 20, or 25, or 30 g/10 min to 50, or 80, or 100, or 200, or 300, or 400, or 500 g/10 min;
  b) an Mz/Mw of at least 4, or 5, or within a range from 4, or 5 to 8, or 10; and
  c) a 1% secant flexural modulus of at least 250 (1720), or 280 (1930), or 300 kpsi (2070 MPa) (0.5 in/min ASTM D790(A)), or within a range from 250 (1720), or 280 (1930), or 300 kpsi (2070 MPa) to 380 (2620), or 400 (2760), or 450 kpsi (3100 MPa) throughout the MFR range. These flexural modulus values are the values without added nucleator.

The inventive polypropylenes can be described by any number of other features, and/or produced in a number of ways. In any embodiment, the polypropylenes have a number average molecular weight (Mn) of at least 10 kg/mole, or within a range from 10 to 35 kg/mole. In any embodiment, the polypropylenes have a weight average molecular weight (Mw) of at least 100 kg/mole, or within a range from 100, or 150 to 600, or 650, or 700, or 800 kg/mole. In any embodiment, the polypropylenes have a z-average molecular weight of at least 900, or 1000 kg/mole, or within a range from 900, or 1000 to 2,000, or 2,200, or 2,400, or 2,600 kg/mole.

In any embodiment, the polypropylenes also have an Mw/Mn value of at least 6, or 8, or 10, or within a range from 6, or 8, or 10 to 15, or 16, or 18, or 20, or 24, or 26. In any embodiment, the polypropylenes have an Mz/Mn value of greater than 4, or 10, or 20, or 50, or within a range from 4, or 10, or 20, or 50 to 110, or 120. In any embodiment, the polypropylene also has an Mz+1 value of at least 4,800, or 5,000 kg/mole, or within a range from 4,800, or 5,000 kg/mole to 6,000, or 6,500 kg/mole.

There is a relationship between the MFR and the flexural modulus of the polypropylenes described herein is such that the flexural modulus remains relatively constant over the range from 10, or 20 g/10 min to 80, or 100, or 200, or 300, or 400, or 500 g/10 min, "constant" meaning not varying by more than ±5, or 10, or 15%. It is also noted that over the range of MFR that other properties remain relatively constant. As the MFR of the polypropylenes increase from 2 or 6 g/10 min to 80, or 100 g/10 min, the molecular weight values decrease, but the Mw/Mn and Mz/Mw remain relatively constant, the Mw/Mn varying within a range from 14 to 22, and the Mz/Mw varying within a range from 4 to 7. In any embodiment, the Mz/Mw value for the polypropylene is within a range of 4, or 4.5 to 6.5, or 7 within an MFR range from 10, or 20 g/10 min to 100 g/10 min.

The polypropylenes may have certain desirable thermal properties as well. In any embodiment the polypropylenes have a melting point temperature ($T_m$) of at least 156, or 158, or 160° C., or within a range from 156, or 158, or 160° C. to 168, or 170, or 174° C. In any embodiment the polypropylenes have a crystallization temperature ($T_c$) of at least 116, or 118° C., or within a range from 116, or 118° C. to 124, or 128, or 130, or 134° C. In any embodiment the polypropylene has a heat deflection temperature (HDT) of at least 120, or 122° C., or within a range from 120, or 122° C. to 130, or 134, or 140° C. These are the values without added nucleator.

The polypropylenes may have certain desirable structural properties. In any embodiment the polypropylenes have an average meso run length (MRL) of 130, or 120, or 115 or less, or within a range from 85, or 90, or 95 to 115, or 120, or 130. Also, in any embodiment the polypropylenes have 80, or 85, or 90 or more stereo defects per 10,000 monomers ($D_S$), or within a range from 80, or 85, or 90 to 115, or 120 defects/10,000 monomers.

Figure 3:
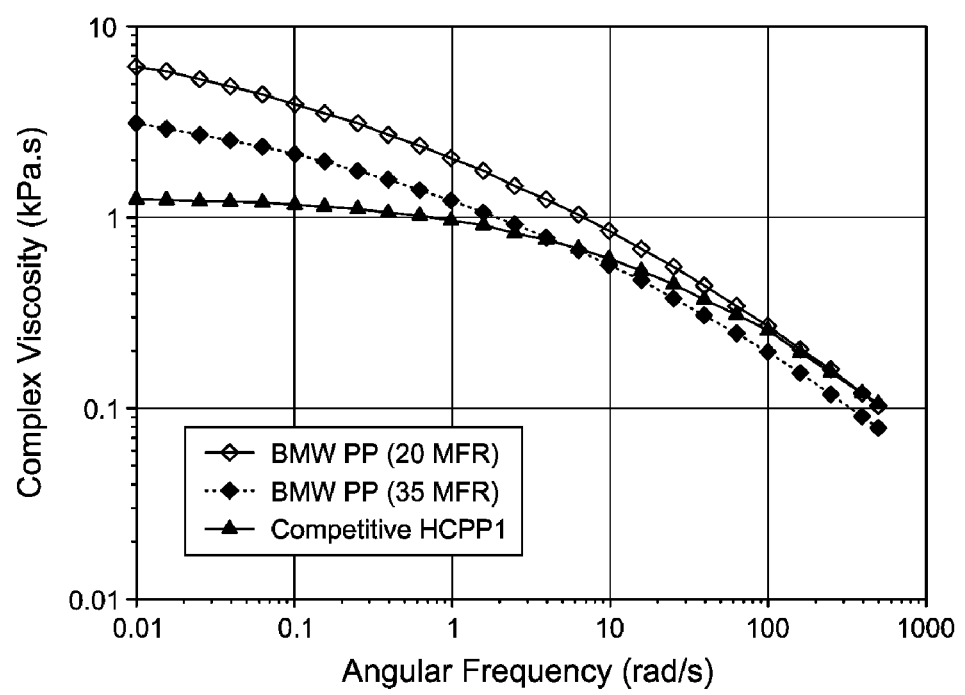
FIG. 3 is a SAOS plot of complex viscosity as a function of angular frequency for the inventive and commercial polypropylenes at MFR's of about 20-35 g/10 min.

The polypropylenes exhibit shear thinning. For instance, the complex viscosity (logarithm) of the polypropylenes as a function of angular frequency applied to the melt at 190° C. possess a nearly linear (negative slope) relationship, such as shown in FIG. 3. The polypropylenes possess a relatively high complex viscosity at very low frequencies (e.g., 0.01 rad/sec), but very low complex viscosity at high frequencies (e.g. 100 rad/sec). In any embodiment the polypropylenes have a complex viscosity of less than 300, or 250 Pa·s, or within a range from 250 to 400, or 500 Pa·s at 100 rad/s (190° C.). Also in any embodiment the polypropylenes have a complex viscosity of at least 2000, or 2500 Pa·s, or within a range from 2500, or 3000 Pa·s to 8000, or 10,000 Pa·s at 0.01 rad/s (190° C.).

The polypropylenes can also be described by other mechanical properties. In any embodiment the polypropylenes have an Izod impact of at least 0.2, or 0.3 ft-lb/in (23° C.), or within a range from 0.2, or 0.3 to 1, or 1.2, or 2, or 2.4 ft-lb/in (23° C.). Also in any embodiment the polypropylenes may have a tensile strength at yield within a range from 34, or 36 MPa to 42, or 44, or 46, or 48 MPa.

The polypropylenes can be produced by any means of olefin polymerization, but are preferably produced from a single catalyst and single stage polymerization process. By "single catalyst", what is meant is that the olefins are contacted with a catalyst derived from the same or similar preparation, thus having the same or similar homogeneous composition such as a single Ziegler-Natta type of catalyst, metallocene catalyst, or other catalyst. Most preferably, the single catalyst is a Ziegler-Natta catalyst with one or more external electron donors in a slurry polymerization system, preferably two external donors whose overall concentration can be varied, and/or they can be varied with respect to one another.

In any embodiment the single catalyst is a Ziegler-Natta catalyst that preferably includes a solid titanium catalyst component comprising titanium as well as magnesium, halogen, at least one non-aromatic "internal" electron donor, and at least one, preferably two or more "external" electron donors. The solid titanium catalyst component, also referred to as a Ziegler-Natta catalyst, can be prepared by contacting a magnesium compound, a titanium compound, and at least the internal electron donor. Examples of the titanium compound used in the preparation of the solid titanium catalyst component include tetravalent titanium compounds having the formula $Ti(OR_n)X_{4-n}$, wherein R is a hydrocarbyl radical, X is a halogen atom, and n is from 0 to 4. For purposes of this disclosure, a hydrocarbyl radical is defined to be $C_1$ to $C_{20}$ radicals, or C1 to C10 radicals, or C6 to C20 radicals, or C7 to C21 radicals that may be linear, branched, or cyclic where appropriate (aromatic or non-aromatic).

Preferably, the halogen-containing titanium compound is a titanium tetrahalide, or titanium tetrachloride. Preferably, the magnesium compound to be used in the preparation of the solid titanium catalyst component includes a magnesium compound having reducibility and/or a magnesium compound having no reducibility. Suitable magnesium compounds having reducibility may, for example, be magnesium compounds having a magnesium-carbon bond or a magnesium-hydrogen bond. Suitable examples of such reducible magnesium compounds include dimethyl magnesium, diethyl-magnesium, dipropyl magnesium, dibutyl magnesium, diamyl magnesium, dihexyl magnesium, didecyl magnesium, magnesium ethyl chloride, magnesium propyl chloride, magnesium butyl chloride, magnesium hexyl chloride, magnesium amyl chloride, butyl ethoxy magnesium, ethyl butyl magnesium, and/or butyl magnesium halides. In combination with the magnesium compound, the titanium-based Ziegler-Natta catalyst is said to be supported.

In any embodiment the Ziegler-Natta catalysts are used in combination with a co-catalyst, also referred to herein as a Ziegler-Natta co-catalyst. Compounds containing at least one aluminum-carbon bond in the molecule may be utilized as the co-catalysts, also referred to herein as an organoaluminum co-catalyst. Suitable organoaluminum compounds include organoaluminum compounds of the general formula $R^1_m Al(OR^2)_n H_p X_q$, wherein $R^1$ and $R^2$ are identical or different, and each represents a C1 to C15 hydrocarbyl radical, or C1 to C4 hydrocarbon radical; X represents a halogen atom; and m is 1, 2, or 3; n is 0, 1, or 2; p is 0, 1, 2, or 3; and q is 0, 1, or 2; and wherein m+n+p+q=3. Other suitable organoaluminum compounds include complex alkylated compounds of metals of Group I of the Period Table (lithium, etc.) and aluminum represented by the general formula $M^1 AlR^1_4$, wherein $M^1$ is the Group I metal such as Li, Na, or K, and $R^1$ is as defined in formula (2). Suitable examples of the organoaluminum compounds include trialkyl aluminums such as trimethyl aluminum, triethyl aluminum and tributyl aluminum; trialkenyl aluminums such as triisoprenyl aluminum; dialkyl aluminum alkoxides such as diethyl-aluminum ethoxide and dibutyl aluminum ethoxide; alkyl aluminum sesquialkoxides such as ethyl aluminum sesquiethoxide and butyl aluminum sesqui-butoxide.

Electron donors are present with the metal components described above in forming the catalyst suitable for producing the polypropylenes described herein. Both "internal" and "external" electron donors are desirable for forming the catalyst suitable for making the polypropylene described herein. More particularly, the internal electron donor may be used in the formation reaction of the catalyst as the transition metal halide is reacted with the metal hydride or metal alkyl. Examples of suitable internal electron donors include amines, amides, ethers, esters, ketones, nitriles, phosphines, stilbenes, arsines, phosphoramides, thioethers, thioesters, aldehydes, alcoholates, and salts of organic acids. More preferably, the one or more internal donors are non-aromatic. The non-aromatic internal electron donor may comprise an aliphatic amine, amide, ester, ether, ketone, nitrile, phosphine, phosphoramide, thioethers, thioester, aldehyde, alcoholate, carboxylic acid, or a combination thereof. Even more preferably, the non-aromatic internal electron donor(s) comprises a C1 to C20 diester of a substituted or unsubstituted C2 to C10 dicarboxylic acid.

In any embodiment, two or more external electron donors are used in combination with the Ziegler-Natta catalyst. The external electron donors may comprise an organic silicon compound of the general formula $R^1{}_n Si(OR^2)_{4-n}$, wherein $R^1$ and $R^2$ independently represent a hydrocarbyl radical and n is 1, 2, or 3. Examples of the suitable organic silicon compounds include trimethylmethoxysilane, trimethylethoxysilane, dimethyldimethoxysilane, dimethyldimethoxysilane, dimethyldiethoxysilane, diiso-propyldiethoxysilane, t-butylmethyl-n-diethoxysilane, t-butylmethyldiethoxysilane, t-amylmethyldiethoxysilane, diphenyldimethoxysilane, phenylmethyldimethoxysilane, diphenyldiethoxysilane, bis-o-tolyldimethoxysilane, bis-m-tolyldimethoxysilane, bis-p-tolyldimethoxysilane, bis-p-tolyldimethoxysilane, bisethylphenyldimethoxysilane, dicyclohexyldiethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyl-triethoxysilane, decyltrimethoxysilane, decyltriethoxysilane, phenyltrimethoxysilane, [gamma]-chloropropyltri-methoxysilane, methyltriethoxysilane, ethyltriethoxysilane, vinyltriethoxysilane, t-butyltriethoxysilane, n-butyltriethoxysilane, iso-butyltriethoxysilane, phenyltriethoxysilane, gamma-aminopropyltriethoxysilane, chlorotriethoxysilane, vinyltributoxysilane, cyclo-hexyltrimethoxysilane, cyclohexyltriethoxysilane, 2-norbornanetriethoxysilane, 2-norbornanemethyldimethoxysilane, ethyl silicate, butyl silicate, trimethyl-phenoxysilane, methylallyloxysilane, vinyltris(beta-methoxyethoxysilane), vinyltriacetoxysilane, dimethyltetraethoxydisiloxane, tetraethoxysilane, methylcyclohexyldimethoxysilane, propyltriethoxysilane, and/or dicyclopentyldimethoxysilane.

Preferably the external electron donors are selected from any one or more of methyltrimethoxysilane, ethyltrimethoxysilane, ethyltriethoxysilane, vinyltriethoxysilane, propyltrimethoxysilane, decyltrimethoxysilane, decyltriethoxysilane, propyltriethoxysilane, butyltriethoxysilane, phenyltriethoxysilane, vinyltrimethoxysilane, vinyltributoxysilane cyclohexyltrimethoxysilane, tetraethoxysilane, methylcyclohexyldimethoxysilane, propyltriethoxysilane, and/or dicyclopentyldimethoxysilane.

In any embodiment, the production of the polypropylene preferably includes the use of two external electron donors, most preferably simultaneously. Suitable methods for using such external electron donors is disclosed in U.S. Pat. Nos. 6,087,459, and 6,686,433. The two external electron donors may be selected from any of the external electron donors described herein. But in a particular embodiment, the first external electron donor has the formula $R^1{}_2Si(OR^2)_2$, wherein each $R^1$ is independently a C1 to C10 hydrocarbyl radical in which the carbon adjacent to the Si is a secondary or a tertiary carbon atom, and wherein each $R^2$ is independently a C1 to C10 hydrocarbyl radical; and the second external electron donor has the formula $R^3{}_n Si(OR^4)_{4-n}$, wherein each $R^3$ and $R^4$ are independently a C1 to C10 hydrocarbyl radical, and n is 1, 2, or 3; wherein the second external electron donor is different than the first external electron donor. The combined concentration of external electron donors can be present with the catalyst and monomer(s) in the reactor to within a range from 10, or 20 ppm to 80, or 100, or 120 ppm.

The concentration of the catalyst system in the polymerization may be from 0.01 to 200 millimoles, or more preferably from 0.05 to 100 millimoles, calculated as a titanium atom, per liter of an inert hydrocarbon medium. The organoaluminum co-catalyst may be present in an amount sufficient to produce from 0.1 to 500 g, or more preferably from 0.3 to 300 g, of a polymer per gram of the titanium catalyst present, and may be present at from 0.1 to 100 moles, or more preferably from 0.5 to 50 moles, per mole of the titanium atom present in the catalyst component.

Examples of suitable means of polymerization include contacting the catalyst and olefins in a gas phase reactor, stirred tank reactor, loop reactor, or other reactors known in the art. The polymerization may take place in the gas phase, as a solution, or as a slurry. In any case, hydrogen may be present in the reactor to modulate the molecular weight of the polypropylene being produced. In any embodiment, the hydrogen, if combined with the single catalyst during the polymerization, is combined at a constant level. This means that the total concentration of hydrogen in the reactor is held constant (varying by no more than 1, or 2, or 3, or 5% of its overall level) during the production of the polypropylene.

The polymerization is most preferably a "single stage" polymerization process, meaning that the olefins and catalyst, and optional hydrogen are contacted under the same or similar conditions throughout the production of the polypropylene, such as in a single reactor, or multiple reactors in parallel or series, held at a constant level of temperature, pressure, monomer concentration, and hydrogen concentration, where no parameter changes by more than ±2%, or ±5%, or ±10% going from one reactor to another. Thus, for example, a polymerization is single stage even if performed in two or more loop slurry reactors in parallel if the reactor conditions are held at a constant level.

The phrases "slurry polymerization process" or "slurry polymerization reactor" refer to a process or reactor that handles polymer that is only partly dissolved or not dissolved at all in the medium, either monomer, solvent, or both, typically having at least 20 wt % polymer suspended or not dissolved.

In a typical solution or slurry polymerization process, catalyst components, solvent, monomers and hydrogen (when used) are passed under pressure to one or more polymerization reactors. Catalyst components may be passed in the inventive processes to the polymerization reactor as a mixture in aliphatic hydrocarbon solvent, in oil, a mixture thereof, or as a dry powder. Most preferably, the polymerization process is carried out using propylene as the only solvent.

In any case, the temperature of the reactor can be controlled by the rate of catalyst addition (rate of polymerization), the temperature of the solvent/monomer feed stream and/or the use of heat transfer systems. For olefin polymerization, reactor temperatures can range from 50 to 120° C. or more, while pressures are generally higher than 300 psig, or within a range from 300 psig to 1000, or 1200 psig. These process conditions are in favor of in-situ catalyst activation since high temperature enhances the solubility of catalysts and activators in aliphatic hydrocarbon solvent. In any embodiment, the polymerization temperature is preferably at least 50, or 60, or 70° C., or within a range from 50, or 60, or 70, or 80, or 90, or 100, or 120° C. to 130, or 140, or 150, or 160, or 170° C.

The propylene and, if present, ethylene and/or other C4 to C12 α-olefins, are dissolved/dispersed in the solvent either prior to being passed to the polymerization reactor (or for gaseous monomers, the monomer may be passed to the reactor so that it will dissolve in the reaction mixture). Prior to mixing, the solvent and monomers are generally purified to remove potential catalyst poisons. The feedstock may be heated or cooled prior to delivery to the first reactor. Additional monomers and solvent may be added to the second reactor, and it may be heated or cooled. Preferably the solvent is the propylene monomer itself.

The catalysts/activators can be passed to one polymerization reactor or split between two or more reactors. In solution or slurry polymerization, polymer produced is molten and remains dissolved or partially dissolved in the solvent under reactor conditions, forming a polymer solution. The catalyst may be passed to the reactor in solid form or as a slurry/suspension in a solvent. Alternatively, the catalyst suspension may be premixed with the solvent in the feed stream for the polymerization reaction. Catalyst can be activated in-line, or by an activator with which it is co-supported. In some instances premixing is desirable to provide a reaction time for the catalyst components prior to entering the polymerization reactor, but this step is preferably absent. The catalyst activity is preferably 20,000 kg polymer per kg of catalyst or more, more preferably 50,000 kg polymer per kg of catalyst or more, even more preferably 100,000 kg polymer per kg of catalyst or more.

In any embodiment, the solution or slurry polymerization processes of this disclosure includes a stirred reactor system comprising one or more stirred polymerization reactors. Generally the reactors should be operated under conditions to achieve a thorough mixing of the reactants. In a dual reactor system, the reactors may operate at the same or different temperatures and fluidly connected in series, but preferably operate at the same temperature or within ±2° C. of one another. The residence time in each reactor will depend on the design and the capacity of the reactor. Preferably, the two or more reactors otherwise operate under the same conditions.

In any embodiment, the solution or slurry polymerization process is carried out in one or more loop-type of reactors, preferably two fluidly connected in series. Such reactor systems include a single reactor and multiple reactors in series or parallel configuration, such as that disclosed in US 2007/0022768. The solvent/monomer, preferably simply propylene, flow in these reactors is typically maintained using pumps and/or pressure systems, and may operate continuously by having monomer and catalyst feed at one point and extracting the forming polymer from another point, preferably downstream therefrom. The conditions of temperature, catalyst concentration, hydrogen concentration, and monomer concentration may be the same or different in each loop reactor and may be tailored as necessary to suit the desired end product.

In any embodiment, the solution polymerization process of this disclosure uses heat exchanger types of reactor where polymerization reaction takes place in the heat exchanger. The reactors can be one or more shell and tube type of heat exchangers, or one or more spiral type of heat exchanger.

In any embodiment, the polypropylene solution is then discharged from the reactor as an effluent stream and the polymerization reaction is quenched, typically with coordinating polar compounds, to prevent further polymerization. On leaving the reactor system the polymer solution is passed through a heat exchanger system on route to a devolatilization system and polymer finishing process. Under certain conditions of temperature and pressure, the polymer solution can phase separate into a polymer lean phase and a polymer rich phase. The polypropylene can be also recovered from the effluent by coagulation with a non-solvent such as isopropyl alcohol, acetone, or n-butyl alcohol, or the polymer can be recovered by stripping the solvent or other media with heat or steam. One or more conventional additives such as antioxidants can be incorporated in the polymer during the finishing procedure. Possible antioxidants include phenyl-beta-naphthylamine; di-tert-butylhydroquinone, triphenyl phosphate, heptylated diphenylamine, 2,2'-methylene-bis(4-methyl-6-tert-butyl)phenol, and 2,2,4-trimethyl-6-phenyl-1,2-dihydroquinoline, and/or stabilizing agents such as tocopherols or lactones, or other agents as disclosed in WO 2009/007265.

Preferably, the inventive polypropylenes are "reactor grade" meaning that the polymers have not undergone any post-reactor process to change their chemical structure (e.g., cross-linking, branching, grafting), such as by reactive extrusion, electron-beam or ultra-violet radiation treatment, or silane grafting. A polypropylene is "reactor grade" if for example no byproducts of peroxide reactions (visbreaking or cross-linking/long chain branch inducing) can be detected, and no grafted moieties are detected, and no long chain branching and/or cross-linked chains are detected. Byproducts of peroxide reactions include alcohols and ketones and can be detected by NMR. Long chain branching can be determined using the intrinsic viscosity (g'vis) of a polymer, which should have a value of less than 0.98, or 0.97, or 0.96 for a branched and/or cross-linked polypropylene. The g'vis value for a polymer can be determined using a high temperature viscometer, in conjunction with GPC methods described further herein. In any embodiment the polypropylene produced from a single catalyst and single stage polymerization process, where preferably no other process has been carried out to alter the chemical structure of the polypropylene molecules.

Nonetheless, in any embodiment the polypropylenes described herein may be subject to any number of post-reactor processing, such as reactive extrusion processes described in WO 2016/126429 A1. Thus in any embodiment the polypropylene is combined with an organic peroxide, especially a short half-life peroxide in a melt extrusion process to produce a branched polypropylene, such polypropylenes typically having an enhanced melt strength and extensional viscosity. Preferably, this takes place in the absence of any additional monomers or cross-linking agents such as butadiene, 1,9-decadiene, norbornenes, or other diene-type monomers known in the art. Useful organic peroxides include those that are short half-life peroxides such as di-sec-butyl peroxydicarbonate, diisopropyl peroxydicarbonate, dicyclohexyl peroxydicarbonate, di(4-tert-butylcyclohexyl) peroxydicarbonate, dicetyl peroxydicarbonate, dibutyl peroxydicarbonate, di(2-ethylhexyl) peroxydicarbonate, didodecyl peroxydicarbonate, diicosyl peroxydicarbonate, and ditetracosyl peroxydicarbonate. Also, the polypropylene may be treated with a long half-life peroxide such as 2,5-dimethyl-2,5-di(tert-butylperoxy) hexane, 2,5-bis(tert-butylperoxy)-2,5-dimethylhexane, di-tert-butyl peroxide, and dicumyl peroxide to effect "vis-breaking" of the polypropylene as is known in the art.

Generally, the inventive polypropylenes find use in making many thermoformed articles such as automotive components, construction components, electronic devices, medical equipment, sports equipment, food containers, appliances, and other domestic and commercial uses. Similarly, the polypropylenes can find use thermoformed articles made from injection molding, blow molding, and rotational molding processes. Preferably, the polypropylenes described herein are useful in injection molding to form articles.

The injection molding process uses a ram or screw-type plunger to force molten polymer into a mold cavity; this solidifies into a shape that has conformed to the contour of the mold. It is most commonly used to process both thermoplastic and, thermosetting polymers, with the volume used of the former being considerably higher. The inventive polypropylenes are useful due to characteristics which make them highly suitable for injection molding, such as the ease with which they may be recycled, their versatility allowing them to be used in a wide variety of applications, and their ability to soften and flow upon heating. The temperature is preferably kept below the decomposition temperature of the polypropylene, preferably within a range from 140° C. to 200, or 240° C. Thermoplastics such as the polypropylenes described herein also have an element of safety over thermosets; if a thermosetting polymer is not ejected from the injection barrel in a timely manner, chemical cross-linking may occur causing the screw and check valves to seize and potentially damaging the injection molding machine.

Injection molding consists of high pressure injection of the raw material into a mold which shapes the polymer into the desired shape. Molds can be of a single cavity or multiple cavities. In multiple cavity molds, each cavity can be identical and form the same parts or can be unique and form multiple different geometries during a single cycle.

When thermoplastics such as the polypropylenes described herein are molded, typically pelletized material, preferably compounded with desirable additives such as antioxidants and alkyl-radical scavengers, is fed through a hopper into a heated barrel with a reciprocating screw. Upon entrance to the barrel the temperature increases and the molecular forces that resist relative flow of individual chains are weakened. This process reduces its viscosity, which enables the polymer to flow with the driving force of the injection unit. The screw delivers the raw material forward, mixes and homogenizes the thermal and viscous distributions of the polymer, and reduces the required heating time by mechanically shearing the material and adding a significant amount of frictional heating to the polymer. The material feeds forward through a check valve and collects at the front of the screw into a volume known as a shot. A "shot" is the volume of material that is used to fill the mold cavity, compensate for shrinkage, and provide a cushion (approximately 10% of the total shot volume, which remains in the barrel and prevents the screw from bottoming out) to transfer pressure from the screw to the mold cavity. When enough material has gathered, the material is forced at high pressure and velocity into the part forming cavity. To prevent spikes in pressure, the process normally uses a transfer position corresponding to a 95 to 98% full cavity where the screw shifts from a constant velocity to a constant pressure control. Often injection times are well under 1 second.

In any case, once the screw reaches the transfer position the packing pressure is applied, which completes mold filling and compensates for thermal shrinkage, which is quite high for thermoplastics relative to many other materials. The packing pressure is applied until the gate (cavity entrance) solidifies. Due to its small size, the gate is normally the first place to solidify through its entire thickness. Once the gate solidifies, no more material can enter the cavity. At this stage, the screw reciprocates and acquires material for the next cycle while the material within the mold cools so that it can be ejected and be dimensionally stable. This cooling duration can be reduced by the use of cooling lines circulating water or oil from an external temperature controller. Once the required temperature has been achieved, the mold opens and an array of pins, sleeves, strippers, etc. are driven forward to demold the article. Then, the mold closes and the process is repeated.

For a two shot mold, two separate materials are incorporated into one part. This type of injection molding is used to add a soft touch to knobs, to give a product multiple colors, to produce a part with multiple performance characteristics.

Injection molding is used to create many articles such as packaging, food containers, bottle caps, automotive parts and components, electronics casings, beauty care products, some musical instruments (and parts of them), one-piece chairs and small tables, storage containers, consumer goods containers for such items as moist wipes and food items, mechanical parts, and most other plastic articles available. Injection molding is ideal for producing high volumes of the same article.

The various descriptive elements and numerical ranges disclosed herein for the inventive polypropylenes and methods of forming such can be combined with other descriptive elements and numerical ranges to describe the invention(s); further, for a given element, any upper numerical limit can be combined with any lower numerical limit described herein, including the examples in jurisdictions that allow such combinations. The features of the inventions are demonstrated in the following non-limiting examples.

Examples

Methodology.

Polypropylenes (hPP) having an Mz/Mw of at least 4 and an Mw/Mn of at least 10 ("BMW PP") in a range of melt flow rates were produced in a stirred tank slurry polymerization reactor by contacting propylene, and optionally ethylene as stated in the final weight percentages in the tables below, with a Ziegler-Natta catalyst solid as described herein, triethylaluminum (TEAL), and propyltriethoxysilane and dicyclopentyldimethoxysilane as external donors, and hydrogen to a final MFR as stated in the tables. The reactor was operated as a single stage in that the conditions of hydrogen, temperature, external electron donor, and pressure were constant. Exemplary reactor conditions are as shown in Table 1.

TABLE 1

Suitable Loop-Slurry Polymerization Reactor Conditions

|  | 2 MFR hPP | 25 MFR hPP | 35 MFR hPP |
|---|---|---|---|
| Donors (wppm in propylene) | 30 | 30 | 30 |
| TEAL (wppm in propylene) | 50 | 50 | 50 |
| H2 concentration (mppm) | 8,000 | 31,000 | 37,000 |
| Reaction level (inches H₂O) | 16 | 16 | 16 |
| Reaction residence time (hours, calculated) | 1.7 | 1.7 | 1.7 |
| reaction temperature (° C.) | 70 | 70 | 70 |

Molecular Weight Determinations.

Given that polymers are a collection of individual molecules each having its own molecular weight, the expression of the molecular weight of the collective "polymer" takes several statistical forms. The number average molecular weight (Mn) of the polymer is given by the equation $\Sigma n_i M_i / \Sigma n_i$, where "M" is the molecular weight of each polymer "i". The weight average molecular weight (Mw), z-average molecular weight (Mz), and Mz+1 value are given by the equation $\Sigma n_i M_i^{n+1} / \Sigma n_i M_i^n$, where for Mw, n=1, for Mz, n=2, and for Mz+1, n=3, where $n_i$ in the foregoing equations is the number fraction of molecules of molecular weight $M_i$. Reported and claimed values for Mn are ±2 kg/mole, for Mw are ±50 kg/mole, and for Mz are ±100 kg/mole. The expression "Mw/Mn" is the ratio of the weight average molecular weight (Mw) to the number average molecular weight (Mn), while the "Mz/Mw" is the ratio of the Mw to the Mz, an indication of the amount of high molecular weight component to the polypropylene.

The Mw, Mn, and Mz values for the polypropylenes were determined by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10 μm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1 μm Teflon filter and degassed with an online degasser before entering the GPC instrument. The nominal flow rate is 1.0 mL/min and the nominal injection volume is 200 μL. The whole system including transfer lines, columns, detectors are contained in an oven maintained at 145° C. Given amount of polymer sample is weighed and sealed in a standard vial with 80 μL flow marker (heptane) added to it. After loading the vial in the autosampler, polymer is automatically dissolved in the instrument with 8 mL added TCB solvent. The polymer is dissolved at 160° C. with continuous shaking for about 1 hour for most PE samples or 2 hour for PP samples. The TCB densities used in concentration calculation are 1.463 g/ml at room temperature and 1.284 g/ml at 145° C. The sample solution concentration is from 0.2 to 2.0 mg/ml, with lower concentrations being used for higher molecular weight samples.

The concentration "c" at each point in the chromatogram is calculated from the baseline-subtracted infra-red broadband signal intensity "I" using the following equation:

$$c = \beta I,$$

where β is the mass constant determined with PE or PP standards. The mass recovery is calculated from the ratio of the integrated area of the concentration chromatography over elution volume and the injection mass which is equal to the pre-determined concentration multiplied by injection loop volume.

The conventional molecular weight (by infra-red detection) was determined by combining universal calibration relationship with the column calibration which was performed with a series of monodispersed polystyrene (PS) standards ranging from 700 to 10M g/mole. The molecular weight "M" at each elution volume is calculated with following equation:

$$\log M = \frac{\log(K_{PS}/K)}{a+1} + \frac{a_{PS}+1}{a+1} \log M_{PS},$$

where the variables with subscript "PS" stands for polystyrene while those without a subscript are for the test samples. In this method, $a_{PS}$=0.67 and $K_{PS}$=0.000175 while "a" and "K" are calculated from a series of empirical formula published in literature (T. Sun et al., as above). Specifically, a/K=0.695/0.000579 for polyethylene and 0.705/0.0002288 for polypropylene.

The LS detector was a Wyatt Technology High Temperature Dawn Heleos. The molecular weight, M, at each point in the chromatogram was determined by analyzing the LS output using the Zimm model for static light scattering (W. Burchard & W. Ritchering, "Dynamic Light Scattering from Polymer Solutions," in 80 PROGRESS IN COLLOID & POLYMER SCIENCE, 151-163 (Steinkopff, 1989)) and determined using the following equation:

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle θ, "c" is the polymer concentration determined from the DRI analysis, $A_2$ is the second virial coefficient, $P(\theta)$ is the form factor for a mono-disperse random coil, and $K_o$ is the optical constant for the system, as set forth in the following equation:

$$K_o = \frac{4\pi^2 n^2 (dn/dc)^2}{\lambda^4 N_A},$$

where $N_A$ is Avogadro's number, and (dn/dc) is the incremental refractive index for the system, which takes the same value as the one obtained from DRI method, and the value of "n" is as above.

Branching of a polypropylene, the as evidenced by the g'vis value, is determined as follows. A high temperature Viscotek Corporation viscometer, which has four capillaries arranged in a Wheatstone bridge configuration with two pressure transducers, was used to determine specific viscosity. One transducer measures the total pressure drop across the detector, and the other, positioned between the two sides of the bridge, measures a differential pressure. The specific viscosity ($\eta_S$) for the solution flowing through the viscometer was calculated from their outputs. The intrinsic viscosity, [η], at each point in the chromatogram was calculated from the following equation:

$$\eta_S = c[\eta] + 0.3(c[\eta])^2,$$

where "c" is concentration and was determined from the DRI output. The average intrinsic viscosity, $[\eta]_{avg}$, of the sample was calculated using the following equation:

$$[\eta]_{avg} = \frac{\sum c_i [\eta]_i}{\sum c_i},$$

where the summations are over the chromatographic slices, i, between the integration limits. For data processing, the Mark-Houwink constants used were K=0.000579 and a=0.695.

The polypropylenes were characterized using GPC, the results for which are summarized in Table 2. These are from a first set of experiments.

TABLE 2

GPC Characteristics of the polypropylenes, non-nucleated

| Parameter | 1 MFR BMW PP | 2 MFR BMW PP | 25 MFR BMW PP | 43 MFR BMW PP | 90 MFR BMW PP |
|---|---|---|---|---|---|
| Mn (kg/mole) | 26.6 | 26.0 | 16.8 | 13.8 | 11.3 |
| Mw (kg/mole | 536 | 491 | 259 | 219 | 181 |
| Mz (kg/mole) | 1,912 | 1,770 | 1,399 | 1,308 | 1,019 |
| Mw/Mn | 20.1 | 18.9 | 15.4 | 15.8 | 16 |
| Mz/Mw | 3.6 | 3.6 | 5.4 | 6.0 | 5.6 |

Further Methodology.

Some inventive polypropylenes were further characterized by other test methods. Some were nucleated with 1000 ppm sodium benzoate as indicated, otherwise were not. Two sets of experiments were performed, the first set in which the results are set forth in Table 3 (and Table 2), and the second set in which the results are set forth in Tables 4A to 4C. The "standard" commercial polypropylenes are plotted along with inventive polypropylenes from Table 3 in FIG. 1. Blending studies with nucleators were carried out using a 57 mm extruder in the first set of experiments, and a 30 mm extruder in the second set. In the first set of experiments, the grades of polypropylene listed as "PP ####" are all from ExxonMobil Chemical Company (Houston, Tex.). In the second set of experiments, the "competitive HCPP1" is a commercial high crystallinity polypropylene homopolymer. In the tables and FIGs., the term "standard PP" refers to a polypropylene homopolymer having a Mw/Mn value of less than 5, such as between 2.5 to 3.5.

Thermal Properties.

The following Differential Scanning calorimetry (DSC) procedure was used to determine the crystallization temperature ($T_c$) and melting point temperatures ($T_m$) of the polypropylenes. Differential Scanning calorimetry (DSC) was carried out on the polymers using a PerkinElmer DSC 8000. The polymer samples were used as received from the reactor or as blended with nucleator and not annealed. The sample was placed in a zero hermetic pan and encapsulated with lid using a pan press. An empty reference pan sits on a symmetric platform in the DSC cell. Heat flow was measured by comparing the difference in temperature across the sample and the reference. Sample sizes were from 3.5 mg to 5 mg and were heated at rate of 10° C./min from −20° C. to 220° C. in nitrogen gas flowing at a rate of 50 ml/min. The samples were first cooled from 20° C. to −20° C., then heated to 220° C. to remove any thermal history. Then the samples were cooled from 220° C. to −20° C., then heating back up from −20° C. to 220° C. in the second heating processes. All the DSC plots on first cooling and second heating were recorded. The melting point temperature, $T_m$, was recorded during the second heating and is the peak heat flow (zero inflection), and the crystallization temperature, $T_c$, was recorded during the first cooling at the peak minimum (zero inflection).

Flexural Modulus.

The 1% secant flexural modulus was tested per ASTM D790 using 0.05 in/min (Procedure A) and 0.50 in/min speed (Procedure B), completed on a Type 1 Tensile bars molded per ASTM D4101 on a Sumitomo 100 ton electric injection molder.

Small Angle Oscillatory Spectroscopy.

The Small Angle Oscillatory Spectroscopy (SAOS) method was used to determine viscosity at low shear rates. Polymer samples were prepared using hot press (either a Carver Press or Wabash Press) to make disks of 25 mm in diameter and 2.5 mm in thickness. In order to characterize the shear thinning behavior, a rheometer ARES-G2 (TA Instruments) was used to conduct small angle oscillatory shear measurements at angular frequency ranging from 0.01 to 500 rad/s at temperature 190° C. and at a fixed strain of 10%. The data was then converted into viscosity as a function of shear rate. To ensure that selected strain provides measurements within linear deformation range, the strain sweep measurements have been conducted (at angular frequency of 100 Hz). Data was processed using Trios software.

Tacticity Determination by $^{13}$C NMR.

Carbon NMR spectroscopy was used to measure meso pentads, stereo and regio defect concentrations in the polypropylene. Carbon NMR spectra were acquired with a 10-mm broadband probe on a Varian spectrometer having a $^{13}$C frequency of at least 100 MHz. The samples were prepared in 1,1,2,2-tetrachloroethane-d2 (TCE). Sample preparation (polymer dissolution) was performed at 140° C. where 0.25 grams of polymer was dissolved in an appropriate amount of solvent to give a final polymer solution of 3 ml. In order to optimize chemical shift resolution, the samples were prepared without chromium acetylacetonate relaxation agent.

Chemical shift assignments for the stereo defects (given as stereo pentads) can be found in the literature (L. Resconi et al. in 100 CHEM. REV. 1253-1345 (2000)). The stereo pentads (e.g., mmmm, mmmr, mrm, etc.) can be summed appropriately to give a stereo triad distribution (mm, mr and rr) and the mole percentage diads (m and r). Three types of regio defects were quantified: 2,1-erythro, 2,1-threo and 3,1-insertion. The structures and peak assignments for these are also given in the reference by Resconi et al. The concentrations for all regio defects (punctuations) are given in terms of number of regio defects per 10,000 monomer units ($D_R$). Accordingly, the concentration of stereo defects (punctuations) is given as the number of stereo defects per 10,000 monomer units ($D_S$). The total number of defects per 10,000 monomers ($D_{total}$) is calculated as $D_{total}=D_S+D_R$.

The average meso run length (MRL) represents the total number of propylene units (on the average) between defects (stereo and regio) based on 10,000 propylene monomers and is calculated as follows as $MRL=10,000/D_{total}$. This definition of MRL is based upon the number of structural chain punctuations or defects that result from propylene insertions that have occurred in a non-regular fashion (stereo and regio defects). It does not include the punctuations due to the presence of comonomer (e.g., ethylene in a polypropylene random copolymer). The regio defects each give rise to multiple peaks in the carbon NMR spectrum, and these are all integrated and averaged (to the extent that they are resolved from the other peaks in the spectrum), to improve the measurement accuracy. The chemical shift offsets of the resolvable resonances used in the analysis are tabulated in U.S. Pat. No. 7,807,769. The average integral for each defect is divided by the integral for one of the main propylene signals (—$CH_3$, =CH—, —$CH_2$—) and multiplied by 10,000 to determine the defect concentration per 10,000 monomers.

Heat Deflection (Distortion) Temperature.

HDT was measured according to ASTM D648 using a load of 0.45 MPa (66 psi) or 1.8 MPa (264 psi) as designated.

Tensile Strength.

The tensile properties such as tensile strength at yield (also referred to here as yield stress) and elongation at yield (also referred to here as yield strain) were measured as per ASTM D638, with a crosshead speed of 50.8 mm/min (2.0 in/min) and a gauge length of 50.8 mm (2.0 in), using an Instron machine.

Izod Impact Strength.

The Izod impact of the polypropylenes and commercial examples was tested per ASTM D256.

Melt Flow Rate.

The MFR was tested per ASTM D1238, 230° C., 2.16 kg.

Rockwell Hardness.

ASTM D785.

TABLE 3

First set of Inventive and commercial polypropylene studies for Flexural Modulus and Izod Impact as a function of Melt Flow Rate

| Grade (non-nucleated) | MFR (g/10 min) | HDT (° C.) | 1% Sec Modulus @ 0.05 in/min (kpsi) | 1% Sec Modulus @ 0.5 in/min (kpsi) | 1% Sec Modulus @ 0.05 in/min (MPa) | 1% Sec Modulus @ 0.5 in/min (MPa) | Izod Impact @ 23° C. (ft-lb/in) |
|---|---|---|---|---|---|---|---|
| BMW PP | 1 | 105 | — | 331 | — | 2280 | 1.1 |
| BMW PP | 1 | 118 | 270 | 309 | 1860 | 2130 | 1.3 |
| BMW PP | 2 | 114 | 287 | 343 | 1980 | 2360 | 1.3 |
| BMW PP | 2 | 120 | — | 358 | — | 2470 | 0.8 |
| BMW PP | 3 | 108 | — | 348 | — | 2400 | 0.8 |
| BMW PP | 7 | 112 | — | 369 | — | 2540 | 0.7 |
| BMW PP | 8 | 111 | — | 362 | — | 2420 | 0.7 |
| BMW PP | 13 | 113 | — | 367 | — | 2530 | 0.6 |
| BMW PP | 15 | 113 | — | 364 | — | 2510 | 0.5 |
| BMW PP | 25 | 125 | 322 | 365 | 2220 | 2520 | 0.6 |
| BMW PP | 43 | 125 | 320 | 360 | 2210 | 2480 | 0.6 |
| BMW PP | 60 | 123 | 296 | 329 | 2040 | 2270 | 0.5 |
| BMW PP | 90 | 122 | 292 | 326 | 2020 | 2250 | 0.5 |
| PP1605 | 32 | 92 | 197 | — | — | — | 0.3 |
| PP1024E4 | 13 | 106 | 222 | 252 | — | — | 0.5 |
| PP1074KNE1 | 20 | 120 | 253 | 291 | — | — | 0.4 |
| PP1572 | 2.1 | 112 | 257 | — | — | — | 1.0 |
| PP2252E1 | 3.5 | 106 | 231 | 263 | — | — | 0.9 |

TABLE 4A

Second set of inventive and commercial polypropylene DSC and $^{13}C$ measurements

| Sample Description | MFR | $T_m$ (° C.) | Tc (° C.) | $D_S$ | MRL |
|---|---|---|---|---|---|
| BMW PP (20 MFR) | 20 | 162 | 119 | 99 | 101 |
| BMW PP (20 MFR) w/ NaBz | 19 | 164 | 123 | 90 | 112 |
| BMW PP (35 MFR) | 35 | 162 | 118 | 101 | 99 |
| BMW PP (35 MFR) w/ NaBz | 33 | 164 | 127 | 115 | 87 |
| Competitive HCPP1 | 36 | 166 | 128 | 48 | 208 |
| ExxonMobil ™ PP3155 | 36 | 162 | 116 | — | — |

TABLE 4B

Second set of inventive and commercial polypropylene Flexural Modulus measurements

| Sample Description | 1% Sec Mod @ 0.05 in/min (kpsi) | 1% Sec Mod @ 0.05 in/min (MPa) | 1% Sec Mod @ 0.5 in/min (kpsi) | 1% Sec Mod @ 0.5 in/min (MPa) |
|---|---|---|---|---|
| BMW PP (20 MFR) | 337 | 2320 | 376 | 2590 |
| BMW PP (20 MFR) w/ NaBz | 362 | 2500 | 399 | 2750 |
| BMW PP (35 MFR) | 323 | 2230 | 359 | 2480 |
| BMW PP (35 MFR) w/ NaBz | 357 | 2460 | 396 | 2730 |
| Competitive HCPP1 | 333 | 2300 | 368 | 2540 |
| ExxonMobil ™ PP3155 | 205 | 1414 | — | — |

TABLE 4C

Second set of inventive and commercial polypropylene heat deflection and tensile measurements

| Sample Description | HDT (° C.) | Tensile Strength at Yield (MPa) | Extension at Yield (%) | Rockwell Hardness |
|---|---|---|---|---|
| BMW PP (20 MFR) | 121 | 38.2 | 4.9 | 103 |
| BMW PP (20 MFR) w/ NaBz | 126 | 41.8 | 5.0 | 109 |
| BMW PP (35 MFR) | 116 | 37.1 | 5.0 | 103 |
| BMW PP (35 MFR) w/ NaBz | 127 | 41.6 | 4.9 | 110 |
| Competitive HCPP1 | 131 | 41.8 | 5.0 | 111 |
| ExxonMobil ™ PP3155 | 96 | 35.2 | 9.0 | — |

As used herein, "consisting essentially of" means that the claimed article or polymer includes only the named components and no additional components that will alter its measured properties by any more than 20, or 15, or 10%, and most preferably means that "additives" are present to a level of less than 5, or 4, or 3, or 2 wt % by weight of the composition. Such additional additives can include, for example, fillers, nucleators or clarifiers, colorants, antioxidants, alkyl-radical scavengers (preferably vitamin E, or other tocopherols and/or tocotrienols), anti-UV agents, acid scavengers, curatives and cross-linking agents, aliphatic and/or cyclic containing oligomers or polymers (often referred to as hydrocarbon resins), and other additives well known in the art. As it relates to a process, the phrase "consisting essentially of" means that there are no other process features that will alter the claimed properties of the polymer, polymer blend or article produced therefrom by any more than 10, 15 or 20%, but there may otherwise be minor process features not named.

For all jurisdictions in which the doctrine of "incorporation by reference" applies, all of the test methods, patent publications, patents and reference articles are hereby incorporated by reference either in their entirety or for the relevant portion for which they are referenced.

The invention claimed is:

1. A reactor grade polypropylene comprising within a range from 0 wt % to 4 wt % ethylene and/or C4 to C12 α-olefin derived units, having
   a) a melt flow rate (MFR, 230° C./2.16 kg) of 20 to 500 g/10 min;
   b) a flexural modulus of at least 250 kpsi (0.5 in/min ASTM D790(A));
   c) an Mw/Mn value of 10-20; and
   d) an Mz/Mw value of 4-7.

2. The reactor grade polypropylene of claim 1, wherein the reactor grade polypropylene has an Mz/Mn value within a range of 40-140.

3. The reactor grade polypropylene of claim 1, wherein the reactor grade polypropylene has an Mz+1 value of at least 4,800 kg/mole.

4. The reactor grade polypropylene of claim 1, wherein the reactor grade polypropylene has a melting point temperature ($T_m$) of at least 156° C.

5. The reactor grade polypropylene of claim 1, wherein the reactor grade polypropylene has a crystallization temperature ($T_c$) of at least 116° C.

6. The reactor grade polypropylene of claim 1, wherein the reactor grade polypropylene has a heat deflection temperature (HDT) of at least 120° C.

7. The reactor grade polypropylene of claim 1, wherein the reactor grade polypropylene has an average meso run length (MRL) of 130 or less.

8. The reactor grade polypropylene of claim 1, wherein the reactor grade polypropylene has 80 or more stereo defects per 10,000 monomers ($D_s$).

9. The reactor grade polypropylene of claim 1, wherein the reactor grade polypropylene has a complex viscosity of less than 300 Pa·s at 100 rad/s (190° C.) and/or a complex viscosity of at least 2000 Pa·s at 0.01 rad/s (190° C.).

10. The reactor grade polypropylene of claim 1, wherein the reactor grade polypropylene has an Izod impact strength of at least 0.2 ft-lb/in (23° C.).

11. The reactor grade polypropylene of claim 1, wherein the reactor grade polypropylene is a branched polypropylene formed by reactive extrusion with an organic peroxide.

12. The reactor grade polypropylene of claim 1, wherein the reactor grade polypropylene is a visbroken polypropylene formed by reactive extrusion with a peroxide.

13. The reactor grade polypropylene of claim 1, wherein the Mw/Mn value is 14-20.

14. An injection molded article comprising the reactor grade polypropylene of claim 1.

15. A reactor grade polypropylene comprising within a range from 0 wt % to 4 wt % ethylene and/or C4 to C12 α-olefin derived units, having
   a) a melt flow rate (MFR, 230° C./2.16 kg) of 10 to 500 g/10 min;
   b) a flexural modulus of at least 250 kpsi (0.5 in/min ASTM D790(A)); and
   c) a complex viscosity of less than 300 Pa·s at 100 rad/s (190° C.) and/or a complex viscosity of at least 2000 Pa·s at 0.01 rad/s (190° C.).

16. A process to produce a reactor grade polypropylene comprising within a range from 0 wt % to 4 wt % ethylene and/or C4 to C12 α-olefin derived units, the process comprising combining propylene and optional ethylene and/or C4 to C12 α-olefins with a single catalyst in a single stage polymerization process, the reactor grade polypropylene having a melt flow rate (MFR, 230° C./2.16 kg) of 20 to 500 g/10 min, a flexural modulus of at least 250 kpsi (0.5 in/min ASTM D790(A)), an Mw/Mn value of 10-20, and an Mz/Mw value of 4-7.

17. The process of claim 16, wherein there is no post-reactor processing of the reactor grade polypropylene to obtain the melt flow rate and the flexural modulus.

18. The process of claim 16, wherein the single catalyst is a Ziegler-Natta catalyst with one or more external electron donors in a slurry polymerization system.

19. The process of claim 16, wherein hydrogen, if combined with the single catalyst during the single stage polymerization process, is combined at a constant level.

20. The process of claim 16, further comprising performing reactive extrusion of the reactor grade polypropylene with an organic peroxide to form a branched polypropylene.

21. The process of claim 16, further comprising performing reactive extrusion with a peroxide to form a visbroken polypropylene.

* * * * *